United States Patent [19]

Reiss

[11] 4,340,134
[45] Jul. 20, 1982

[54] BALL SHIFT MECHANISM
[75] Inventor: Garry K. Reiss, Mt. Vernon, Ohio
[73] Assignee: The J. B. Foote Foundry Co., Fredericktown, Ohio
[21] Appl. No.: 128,451
[22] Filed: Mar. 10, 1980
[51] Int. Cl.³ ............................................. F16D 11/10
[52] U.S. Cl. .................................. 192/67 R; 192/108
[58] Field of Search ..................... 192/67 R, 101, 108; 64/9 A

[56] References Cited

U.S. PATENT DOCUMENTS

| 900,578 | 10/1908 | Nichols | 192/108 X |
| 1,748,146 | 2/1930 | Ricefield | 64/9 A |
| 1,836,773 | 12/1931 | Salerni | 192/67 R X |
| 2,060,473 | 11/1936 | Schumb | 64/9 A |
| 2,359,267 | 9/1944 | Horowitz | 192/67 R |
| 4,117,652 | 10/1978 | Jones et al. | 192/67 R X |

FOREIGN PATENT DOCUMENTS

| 460394 | 11/1913 | France | 192/67 R |
| 16521 | of 1913 | United Kingdom | 192/67 R |
| 361027 | 11/1931 | United Kingdom | 192/67 R |

*Primary Examiner*—Rodney H. Bonck
*Attorney, Agent, or Firm*—Allen D. Gutchess, Jr.

[57] ABSTRACT

Shift mechanism for a transmission is provided for engaging and disengaging a gear therein. The mechanism is particularly designed to disengage the gear even when the transmission is under a heavy load. The shift mechanism includes a clutch dog or collar on a shaft with the collar having at least one lug or projection which is engagable with and disengagable from a lug or projection on a gear rotatably carried on the shaft. One of the collar and gear has a recess adjacent its respective lug in which a ball is located with the ball also being retained by a retaining ring mounted on the collar or gear. When the collar and gear are in an engaged position, both lugs are in contact with the ball; when the collar is moved away from the gear to disengage the collar and the gear, the point contact of the lugs and ball enables disengagement of the collar from the gear even when the transmission is under a heavy load.

2 Claims, 5 Drawing Figures

BALL SHIFT MECHANISM

This invention relates to shift mechanism for shifting a clutch collar or the like into engagement with a gear and for moving the collar out of engagement with the gear even when a transmission or the like in which the mechanism is mounted is under a heavy load.

It is sometimes difficult to disengage a clutch collar from a gear in a small transmission of a riding lawn mower, a garden tractor, or a self-propelled lawn mower. This can particularly occur when the transmission is under a heavy load, such as when the mower is travelling uphill, particularly if it is a self-propelled rear bagger with the load on the rear, driven wheels, by way of example. A dangerous condition can thereby result if the mower cannot be stopped, or at least parts of the shift mechanism can be distorted, bent, or broken.

By forming the lugs or teeth of the clutch collar and gear with their engagable surfaces at angles, about six degrees, for example, the clutch collar and gear can be relatively easily disengaged even when the transmission is under a heavy load. However, this angle causes the lugs to wear much faster and have severely shortened useful life.

The present invention provides a shift mechanism which enables a clutch collar or dog to be disengaged from a gear of a transmission even when it is under a heavy load. The shift mechanism includes the clutch collar which is mounted on a shaft of the transmission for rotatable movement therewith and for lineal movement with respect thereto. The clutch collar has at least one lug or projection extending toward the gear in the transmission, which gear is rotatably mounted on the shaft and has at least one lug or projection facing toward the clutch collar. The clutch collar can have a peripheral flange extending outwardly beyond the collar lug which is engaged by a shifter fork for moving the clutch collar toward and away from the gear, between an engaged position in which the collar is engaged with the gear and a disengaged position in which the collar is spaced from the gear.

One of the clutch collar and gear has a recess adjacent its respective lug in which a ball is located in contact with the respective lug. A retaining ring is also located on the collar or gear to further aid in retaining the ball in place in the recess. A shallow groove is located adjacent the recess to receive the lug of the other one of the collar and gear, with the ball preferably extending out of the recess by a distance exceeding the radius of the ball. The lug of the other one of the collar and gear then contacts the ball, when the collar and gear are in the engaged position, on a point which is on a line parallel to the shaft and tangential to the surface of the ball. This enables solid engagement of the collar and gear. At the same time, even if the transmission is under a heavy load, the collar can be relatively easily disengaged from the gear with the point contact between the lugs and the ball and with the ball having the ability to rotate as the lugs of the collar and gear separate.

It is, therefore, a principal object of the invention to provide improved shift mechanism for a small transmission or the like.

Another object of the invention is to provide shift mechanism for a transmission for disengaging a clutch collar from a gear even when the transmission is under a heavy load.

Yet another object of the invention is to provide shift mechanism including a clutch collar and a gear with lugs facing each other and with one of the collar and gear having a recess in which a ball is received with the ball contacting both lugs when the collar and gear are engaged.

Many other objects and advantages of the invention will be apparent from the following detailed description of a preferred embodiment thereof, reference being made to the accompanying drawings, in which.

Figure 1:
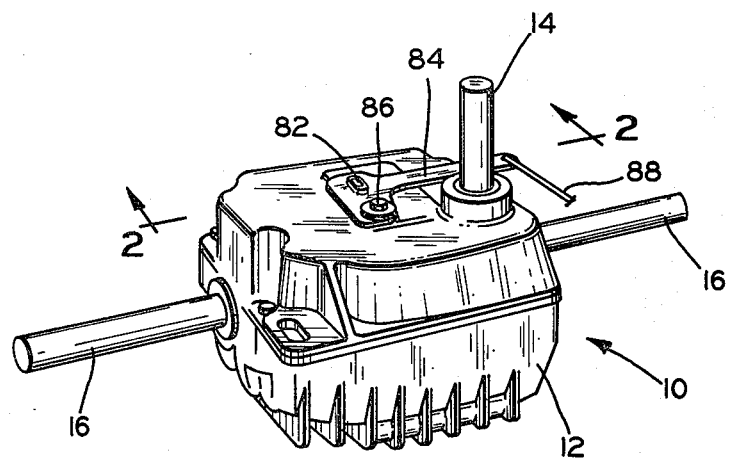
FIG. 1 is a view in perspective of a small transmission embodying shift mechanism according to the invention.

Referring to the drawings, and particularly to FIG. 1, a small transmission embodying the invention is indicated at 10 and can be mounted on a deck of a self-propelled, walking lawn mower, by way of example. With the transmission positioned as in FIG. 1, the mower would be moving from the lower right toward the upper left. The transmission includes a main housing 12 with a vertical input shaft 14 extending upwardly therefrom to receive a drive pulley or the like driven by an internal combustion engine on the mower. A drive shaft 16 extends outwardly from both sides of the housing 12, with the left end being suitably connected to a left rear wheel of the mower and the right end being suitably connected to a right rear wheel of the mower. The basic transmission can be of the type shown in Jones et al U.S. Pat. No. 4,117,652, issued on Oct. 3, 1978.

A drive worm (not shown) is affixed to the drive shaft 14 within the housing 12 and meshes with a worm wheel or gear 18 or other toothed member which is rotatably mounted on the output shaft 16. The shaft 16 is rotatably supported in bushings 20 and 22 having seals 24 and 26. The shaft is prevented from longitudinal movement by pins 28 and 30 on either side of the bushing 20 and bearing against washers 32 and 34.

The worm gear 18 has a recess 36 at one end to receive the seal 26 and one end of the bushing 22. The opposite end of the worm gear has a circular end face 38 cooperating with an upwardly-extending flange 40 in the housing 12, which is made in two halves. The worm gear thereby is restrained from longitudinal movement of the shaft 16 but is free to rotate relative thereto. The gear has a plurality, three in this instance, of lugs or projections 42 extending axially of the shaft 16.

Figure 5:
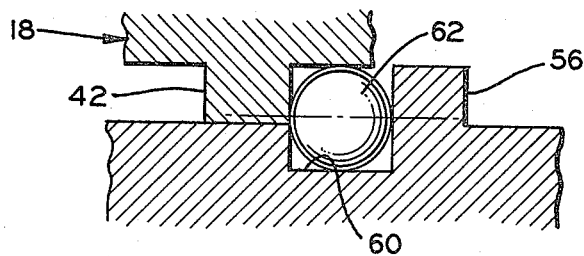
FIG. 5 is a view in cross section, taken along the line 5—5 of FIG. 4.

A clutch collar or dog 44 is mounted on the output shaft 16 for longitudinal but nonrotatable movement with respect thereto. The collar 44 has a bore 46 with a groove 48 receiving a key 50 which extends outwardly from a recess 52 in the shaft 16. The collar 44 has a central hub 54 with a plurality, three in this instance, of lugs or projections 56 extending radially outwardly therefrom and extending axially of the shaft 16 toward the worm gear 18. A rear, outer hub 58 extends outwardly beyond the central hub 54. Locating means in the form of a recess 60 is located adjacent each of the lugs 56 and extends from the periphery of the central hub 54 to the periphery of the outer hub 58. A member with opposite rounded surfaces, preferably a ball or rounded member 62 is located in each of the recesses 60 with the ball having a diameter about equal to the length of the recess 60. The radius of the ball preferably exceeds the depth of the recess 60, as shown in FIG. 5, so that the adjacent faces of the lugs 42 and 56, rather than edges of the lugs, contact the ball 62. When the collar 44 and the gear 18 are engaged, the gear lug 42 then contacts the ball at a point on a line extending through the center of the ball and through the point of contact of the ball with the collar lug 56. Stated another way, each of the lugs 42 and 56 contacts the respective ball 62 at a point which is on a line tangential to the ball 62 and also parallel to the axis of the shaft 16.

The balls 62 are preferably retained in the recesses 60 by a retaining ring 64 which has one end mounted on the outer hub 58 by a press fit or by other suitable means and has at the other end an inwardly-curved shoulder 66 which extends over the ball 62 and terminates in the plane of the face of the central hub 54. The balls 62 are thereby retained in the recesses 60 but preferably can rotate therein. The point contact of the lugs 42 and 56 and the ball 62 enables the collar 44 to be relatively easily disengaged from the gear 18 even when the transmission 10 is under a heavy load. Rotation of the ball 62 also tends to facilitate disengagement of the collar and the gear.

A shallow groove 67 is formed at the face of the outer hub 58 between the edge of the central hub 54 and the inner surface of the retaining ring 64 and extends from the recess 60 to the next one of the lugs 56. The groove 67 provides entry access for the gear lug 42 to move into position to engage the ball 62.

Figure 2:
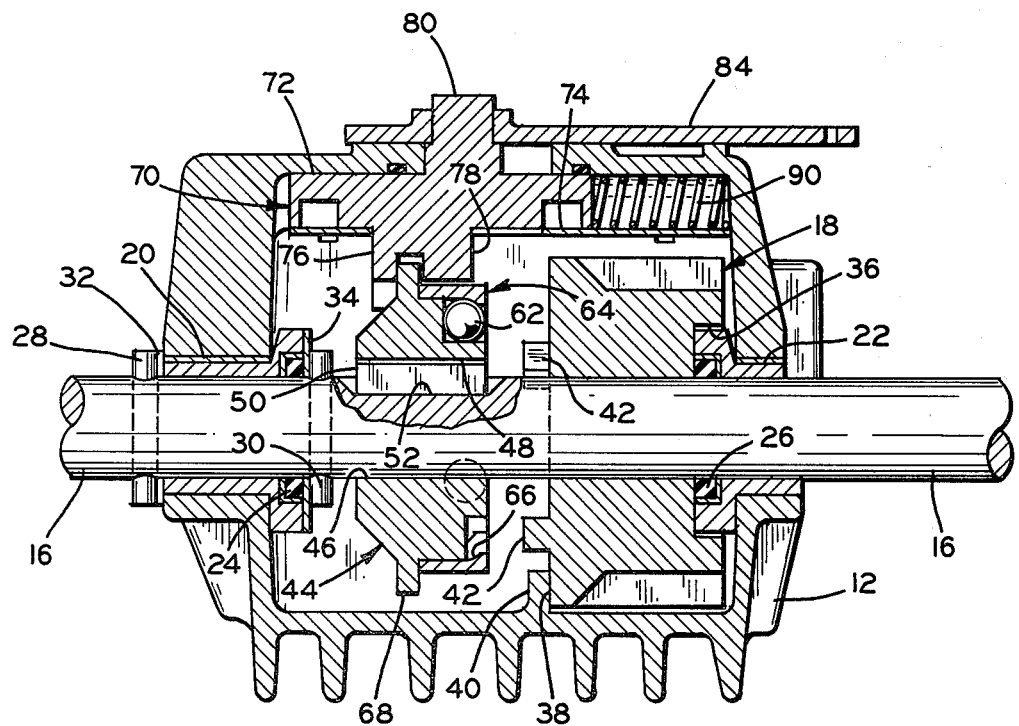
FIG. 2 is a view in longitudinal, vertical cross section, taken along the line 2—2 of FIG. 1.
Figure 3:
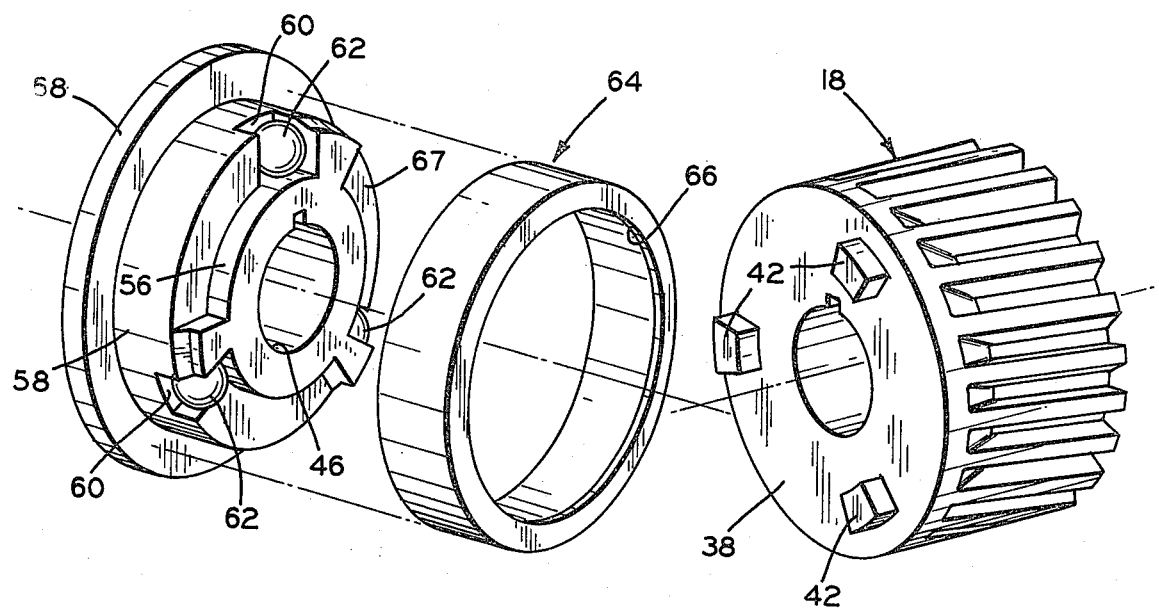
FIG. 3 is a view in perspective of a clutch collar, retaining ring, and gear in accordance with the invention.
Figure 4:
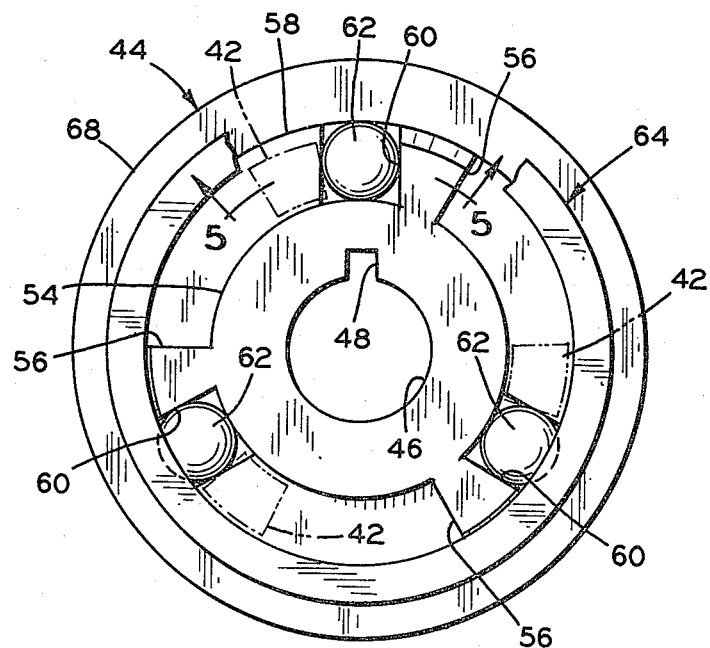
FIG. 4 is an enlarged front view, with parts broken away, of the clutch collar of FIG. 3, with lugs of the gear shown in dotted lines.

To move the collar between an engaged position in which the lugs 42 and 56 are in contact with the ball 62, and a disengaged position in which the lugs 42 are spaced from the balls 62, the clutch collar 44 has an outwardly extending flange 68 on the outer hub 58. A shifter fork 70 is used to move the collar 44 between the two positions. The fork 70 has an upper, generally rectangular block 72 (FIG. 2) located in an upper portion of the housing 12 and supported on a divider plate 74 which is suitably mounted in an upper portion of the housing 12. The shifter fork has two downwardly extending flanges 76 and 78 which engage the sides of the collar flange 68 when the shifter fork is moved parallel to the axle 16.

When the shifter fork 70 is moved toward the worm gear 18, the flange 76 engages the collar flange 68 and moves the collar toward the worm gear with the collar lugs 42 moving into the shallow groove 67 and engaging the balls 62. When the shifter fork 70 is moved away from the worm gear 18, the flange 78 engages the collar flange 68 and moves the collar away from the worm gear, disengaging the gear lugs 42 from the balls 62. This occurs even if the transmission is under a heavy load at the time of the desired disengagement, due to the interaction between the lugs and balls.

The shifter fork 70 can be moved between the two positions by any suitable means. As shown, the fork has a post 80 extending upwardly through the housing 12 and through a slot 82 (FIG. 1) in a shift lever 84. The shift lever 84 has a portion spaced from the slot 82, which lever is pivotally mounted on the housing 12 by a suitable fastener 86. The shifter fork 70 is moved toward the worm gear when the shift lever 84 is pivoted through a bowden cable 88 which is connected to the shift lever and extends to a control lever (not shown) mounted on the operator's handle of the mower. The shifter fork 70 is urged in the opposite direction by coil springs 90 (FIG. 2) located in the upper portion of the housing and bearing against an end of the block 72. From one to three of the springs can be employed, with two being preferred.

While the rounded members 62 are disclosed as being carried by the collar, they can also be carried by the gear. Further, the rounded members 62 can be of shapes other than balls, such as rollers with their axes transverse to the axis of the shaft 16.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Shift mechanism for connecting a rotatable member with a shaft, to cause said member to rotate with said shaft, said mechanism comprising a clutch collar mounted on the shaft for rotatable movement therewith and for lineal movement with respect thereto, said clutch collar having at least one lug extending toward the rotatable member and the rotatable member having at least one lug extending toward said clutch collar, said clutch collar engaging the rotatable member when said collar is in an engaged position, and spaced from the rotatable member when said clutch collar is in a disengaged position, a ball, said lugs having straight surfaces extending substantially parallel to the axis of said shaft, with said straight surfaces contacting said ball at points on a line extending through the center of said ball when said clutch collar is in the engaged position, one of said clutch collar and said rotatable member having a recess for locating said ball adjacent the respective lug, with the other lug contacting said ball when said collar is in the engaged position and spaced from said ball when said collar is in the disengaged position, said one of said clutch collar and said rotatable member having said recess also forming a long shallow groove adjacent said recess to receive the other lug, said ball extending out of said recess above said groove by a distance exceeding the radius of said ball.

2. Shift mechanism for a transmission having a shaft, said mechanism comprising a toothed member rotatably mounted on the shaft, a clutch collar mounted on the shaft for rotatable movement therewith and for lineal movement with respect thereto, said clutch collar having a plurality of lugs extending toward the toothed member and the toothed member having an equal number of lugs extending toward said clutch collar, said clutch collar engaging said toothed member and causing it to rotate with said collar when said collar is in an engaged position, and said clutch collar being spaced from the toothed member and rotatable independently therefrom when said clutch collar is in a disengaged position, balls for said lugs, one of said clutch collar and said toothed member having a recess adjacent each of the respective lugs for locating one of said balls in a position adjacent the respective lug, said one of said clutch collar and said toothed member also having a long shallow groove adjacent each of said recesses to receive the other lugs, with said balls extending out of said recesses above said groove by a distance exceeding the radius of the balls, with the other lugs contacting said balls when said collar is in the disengaged position, each of said lugs having a straight surface extending substantially parallel to the axis of said shaft, with said straight surfaces contacting said balls in a common plane which is substantially perpendicular to the axis of said shaft, when said collar is in the engaged position.

* * * * *